(No Model.)

I. E. NAGLE.
BONNET PIN.

No. 357,020.  Patented Feb. 1, 1887.

Witnesses
Jos. S. Latimer
F. R. Cunningham

Inventor
Israel E. Nagle
By his Attorney
Wm Hunter Myers

UNITED STATES PATENT OFFICE.

ISRAEL E. NAGLE, OF MOUNT JOY, PENNSYLVANIA.

BONNET-PIN.

SPECIFICATION forming part of Letters Patent No. 357,020, dated February 1, 1887.

Application filed November 26, 1886. Serial No. 219,934. (No model.)

*To all whom it may concern:*

Be it known that I, ISRAEL E. NAGLE, a citizen of the United States of America, residing at Mount Joy, in the county of Lancaster and State of Pennsylvania, have invented certain new and useful Improvements in Bonnet-Pins, of which the following is a specification, reference being had therein to the accompanying drawings.

My invention relates to certain improvements in bonnet-pins of the class usually employed by ladies to secure the bonnet to the head; and it has for its object to provide a pin for this purpose whose point while the pin is in use can be drawn within a shield, whereby the dangerous and otherwise objectionable feature of a protruding sharp point is avoided.

The invention consists in providing a pin of the class above stated with a shield, and uniting the pin and shield in such manner that the point of the pin may be retracted within the shield and the longitudinal movements of the pin will be limited.

Figure 1:
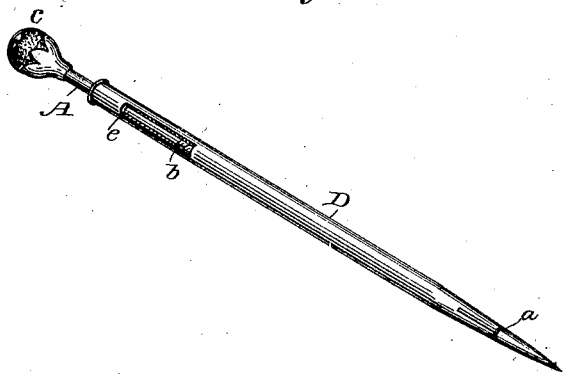
Figure 2:
Figure 3:
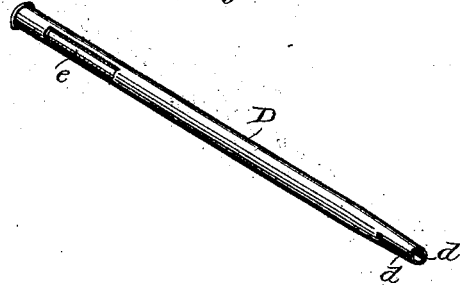

Referring to the accompanying drawings, Figure 1 is a perspective view of the pin and shield together. Fig. 2 is a side view of the pin. Fig. 3 is a perspective view of the shield.

In the drawings, A represents the pin, made of any suitable material. The body of the pin is preferably of a uniform thickness from its head to within a short distance of its point, where it is gradually enlarged to form a rounded shoulder, *a*, beyond which it gradually decreases in thickness and terminates in a sharp point.

*b* represents a stud projecting laterally from the pin, the purposes of which will be hereinafter stated.

*c* represents the head of the pin.

D represents a cylindrical casing or shield, made of any suitable material, but preferably of a thin elastic metal. It is designed to fit neatly over the pin, and, when the latter is projected, incase it from near the head to the shoulder *a*. One end of the shield (which, for convenience of description, may be termed the "lower" end) is gradually tapered on the outer side, the taper of the shield corresponding to the taper of the pin from the shoulder to the point, so that when the end of the shield lies behind the shoulder of the pin, as it does when the pin is projected, there is practically an unbroken surface at the shoulder. The lower end of the shield is split on two sides, as seen at *d*, so as to expand and ride up over the rounded shoulder *a* as the pin is retracted. The upper end is preferably formed with a rounded flange, as seen in Fig. 3, and a short distance below the flange the shield is slotted, as at *e*, for the accommodation of the stud on the pin, which stud projects through the slot and serves to limit the outward and inward movements of the pin, and also to unite the pin and shield.

Other means of limiting the movements of the pin and uniting the parts will readily suggest themselves to the manufacturer—as, for instance, the shield may be slotted on both sides and the stud placed transversely of the pin—and therefore I would have it understood that I consider that and other kindred constructions obvious mechanical equivalents of my lateral stud and slotted opening in the shield.

A pin constructed in accordance with my invention is also well adapted for use as a lady's scarf or dress pin, the head being susceptible, of course, of any desired ornamentation. The fabric will sustain no injury from its use, as the shield is very small in circumference, and its point, when the pin is being inserted, fits snugly behind the shoulder on the pin, so that it cannot catch into and tear the goods.

When it is desired to insert the pin through the hair or the fabric, its point is first projected, and then when the pin is in place its point is retracted within the shield.

Having thus described my invention, what I claim as new, and desire to secure by Letters Patent, is—

1. As an article of manufacture, a bonnet, scarf, or dress pin provided with a shield, the pin passing through the shield and the parts united in such manner that the point of the pin may be retracted within the shield and that the longitudinal movements of the pin will be limited.

2. The combination, with a pin provided with a laterally-projecting stud, of a cylindrical casing or shield having an elongated opening or slot through which the stud on the pin projects, whereby the pin and shield are held together and the longitudinal movements of the pin are limited, substantially as described.

3. The combination, with a pin having an enlarged and rounded shoulder, as described, and provided with a laterally-projecting stud, of a cylindrical casing or shield having a split lower end and an elongated opening or slot through which the stud on the pin projects, whereby the pin and shield are held together and the longitudinal movements of the pin are limited, substantially as set forth.

4. The combination, with a pin having an enlarged and rounded shoulder and tapered from said shoulder to the point, as described, the pin being provided with a laterally-projecting stud, of a cylindrical casing or shield having a split and tapered lower end, the taper of the shield coinciding with the taper of the pin and having an elongated opening or slot through which the stud on the pin projects, whereby when the pin is projected the end of the shield will spring behind the shoulder and thus present a practically unbroken surface between that end of the shield and the pin, for the purpose above set forth.

In testimony whereof I affix my signature in presence of two witnesses.

I. E. NAGLE.

Witnesses:
W. K. MARTIN,
JOHN R. GREINER.